United States Patent
Feilen et al.

(10) Patent No.: US 8,683,233 B2
(45) Date of Patent: Mar. 25, 2014

(54) MOTOR VEHICLE CONTROL DEVICE

(75) Inventors: Oliver Feilen, Lenting (DE); Rudiger Stadtmuller, Ingolstadt/Etting (DE)

(73) Assignee: Audi AG, Ingolstadt (DE)

( * ) Notice: Subject to any disclaimer, the term of this patent is extended or adjusted under 35 U.S.C. 154(b) by 944 days.

(21) Appl. No.: 10/525,229

(22) PCT Filed: Jul. 23, 2003

(86) PCT No.: PCT/EP03/08024
§ 371 (c)(1),
(2), (4) Date: Oct. 12, 2005

(87) PCT Pub. No.: WO2004/027587
PCT Pub. Date: Apr. 1, 2004

(65) Prior Publication Data
US 2006/0100749 A1    May 11, 2006

(30) Foreign Application Priority Data
Aug. 21, 2002 (DE) .................................. 102 38 093

(51) Int. Cl.
*G06F 12/14* (2006.01)
(52) U.S. Cl.
USPC .......................................... 713/194; 713/193
(58) Field of Classification Search
None
See application file for complete search history.

(56) References Cited

U.S. PATENT DOCUMENTS

| | | | |
|---|---|---|---|
| 5,763,958 A * | 6/1998 | Yamamoto et al. | 307/10.5 |
| 5,787,367 A * | 7/1998 | Berra | 701/1 |
| 5,870,018 A * | 2/1999 | Person et al. | 340/5.65 |
| 5,950,038 A * | 9/1999 | Okui | 399/43 |
| 6,490,667 B1 * | 12/2002 | Ikeda | 711/163 |
| 6,505,280 B2 * | 1/2003 | Terada et al. | 711/164 |
| 6,671,611 B1 * | 12/2003 | Peltier | 701/104 |
| 6,845,306 B2 * | 1/2005 | Henry et al. | 701/29 |
| 6,927,676 B2 * | 8/2005 | Edens et al. | 340/426.1 |
| 6,934,860 B1 * | 8/2005 | Goldstein | 713/183 |
| 7,062,652 B2 * | 6/2006 | Hirota et al. | 713/172 |
| 7,100,036 B2 * | 8/2006 | Schwartz | 713/2 |

(Continued)

FOREIGN PATENT DOCUMENTS

DE    196 06 552    2/1996
DE    196 46 026    11/1996

(Continued)

OTHER PUBLICATIONS

Roger Alexander et al, Security Device, Dec. 23, 1998; International Publication No. WO 98/58305.

*Primary Examiner* — David Garcia Cervetti
*Assistant Examiner* — Fatoumata Traore
(74) *Attorney, Agent, or Firm* — Staas & Halsey LLP

(57) ABSTRACT

The invention relates to a method for protecting at least one motor vehicle component against manipulation in a control device, which comprises at least one microcomputer (μC) and at least one memory module (2, 3), characterized in that the microcomputer (μC) reads out a specific original identifier (ID) of at least one memory module (2, 3) from the memory module (2, 3) and stores it. Furthermore the invention relates to a control device for a motor vehicle component which comprises at least one microcomputer (μC) and at least one memory module (2, 3), characterized in that at least one memory module (2, 3) has at least one specific identifier (ID) and the microcomputer (μC) has at least one area (11) in which at least one specific original identifier is stored.

15 Claims, 4 Drawing Sheets

(56) References Cited

U.S. PATENT DOCUMENTS

| | | | |
|---|---|---|---|
| 7,207,066 B2* | 4/2007 | Thomas et al. | 726/26 |
| 7,415,332 B2* | 8/2008 | Ito et al. | 701/29 |
| 2001/0027524 A1* | 10/2001 | Krauter et al. | 713/200 |
| 2001/0032289 A1* | 10/2001 | Terada et al. | 711/103 |
| 2004/0003231 A1* | 1/2004 | Levenson et al. | 713/155 |
| 2004/0003232 A1* | 1/2004 | Levenson et al. | 713/155 |

FOREIGN PATENT DOCUMENTS

| | | |
|---|---|---|
| DE | 199 20 744 | 5/1999 |
| DE | 199 22 946 | 5/1999 |
| DE | 100 01 986 | 1/2000 |
| DE | 100 20 977 | 4/2000 |
| GB | 1 197 826 | 4/2002 |
| JP | 1 145 912 | 10/2001 |

* cited by examiner

MOTOR VEHICLE CONTROL DEVICE

This application is a §371 application of PCT/EP03/08204, which claims priority from DE 10238093.7.

BACKGROUND

This invention relates to a motor vehicle control device which is protected against manipulation.

In motor vehicles, control devices, such as for example the engine control device or the transmission control device, are currently used to control individual motor vehicle components. The information which is required for operating these control devices, such as programs and data, are stored encrypted or unencrypted in memory modules ($E^2PROM$, flash and the like). The encryption process is independent of a fixed hardware combination of modules and is generally stored in a rewritable storage medium.

The disadvantage of these control devices and the programs used is that individual memory modules can be replaced or the data on the memory modules can be overwritten via a diagnosis interface or via direct access to the memory module. The replacement of a memory module or overwriting of the data and programs stored on this memory module can lead to the motor vehicle components operating with other characteristics. This is done for example in so-called chip tuning in which the memory modules which are assigned to the engine control device are replaced or the programs and data stored on these memory modules, such as characteristics, are changed. As a result, the output and/or the torque of the engine can be increased for example. If this manipulation is done without adapting the other motor vehicle components, such as the oil cooler, turbocharger, or brakes, damage to these motor vehicle components and safety-critical states can occur.

SUMMARY OF THE INVENTION

The object of this invention is therefore to devise a motor vehicle control device in which replacement of a memory module and changing of the data and of the code on the memory module are not possible without affecting the operability of the control device or at least diagnosing the change and optionally displaying it.

The invention is based on the finding that this object can be attained by using an identifier of the original memory modules of a control device, which identifier cannot be changed, as a means of identification.

The object of the invention is attained in that in a motor vehicle control device the microcomputer reads out at least one specific identifier of the original memory module from the memory module and stores it.

By safeguarding the specific identifier of the original memory module, a constant is provided which can be used to recognize replacement of a memory module or manipulation of data. The identifier can also represent the identification number of the memory module. But it is also possible to use as the identifier the data which were recorded at a certain time in the form of a fingerprint. Finally the identifier can contain additional information such as for example the date of manufacture or the date of first start-up of the control device.

By preference at least one identifier is stored in the OTP (one-time-programmable) area of the microcomputer, which area is writable only once. In this way modification of the identifier in the microcomputer can be prevented and thus protection against manipulation can be enhanced.

The identifiers stored in the microcomputer are used in the process as claimed in the invention at least in part to authenticate the memory modules. Each time the control device is booted up the memory modules which are actually connected to the microcomputer can be authenticated using the original identifiers which are stored in the microcomputer.

In one embodiment, authentication of the memory modules may take place by comparison of the identifier of the original memory modules which has been stored in the microcomputer with the identifier of the current memory modules. Here, when the control device is started up, the current identifiers of the current memory modules which are connected to the microcomputer are read out by the microcomputer and compared to the original identifiers which are stored in the microcomputer. As a result replacement of one or more of the memory modules can be detected and measures can be taken, for example actuation of the control device can be prevented by the microcomputer.

As an alternative or in addition, authentication of the memory modules may take place by encryption of data or programs, the key containing at least one part of one of the original identifiers. This can result in that when the identifier differs from the original identifier the microcomputer cannot access data or programs and thus the control device cannot run.

The data or programs stored unencrypted or encrypted on at least one of the memory modules can be displayed in the form of a fingerprint which records the data and programs at a specific time. If the data or programs are changed, manipulation can be detected when the fingerprint is identified again by comparison with a fingerprint which has been stored encrypted.

According to a second aspect of the invention, the object is attained by a control device for a motor vehicle component which comprises at least one microcomputer (μC) and at least one memory module, at least one memory module having at least one specific identifier and the microcomputer having at least one area in which at least one specific original identifier is stored.

In order to prevent manipulation by changing the identifier stored in the microcomputer, the microcomputer can have a area which is writable only once (OTP area) and the specific original identifier of at least one memory module can be stored in this area. This OTP area can in addition be configured to be read-protected.

The control device can in addition have an authentication unit for authentication of the memory modules which are connected to the microcomputer, and this unit can constitute a program which is stored on the microcomputer.

The authentication unit can therefore be formed by a program which is stored on the microcomputer and which is used for comparison of the original identifiers with at least one current identifier of at least one memory module. As an alternative or in addition, the program for encryption of data or programs can access at least one of the original identifiers stored in the microcomputer.

At least one of the memory modules of the control device can be integrated in the microcomputer. It can be an embedded flash memory or an $E^2PROM$ emulation in the embedded flash memory. In this case as well, storage of an identifier of the memory module in the OTP area of the microcomputer can be used to advantage. Analogously to the external memories, authentication of the memory modules by encryption of data or programs may take place, the key containing at least one part of one of the original identifiers. This can result in that when the identifier differs from the original identifier, the microcomputer cannot access data or programs and thus the control device cannot run.

Features and details which are described in conjunction with the process as claimed in the invention apply accordingly to the control device as claimed in the invention and vice versa.

BRIEF DESCRIPTION OF THE DRAWINGS

The invention will be described in greater detail below with the aid of possible embodiments illustrated in the attached drawings in which.

DETAILED DESCRIPTION OF THE INVENTION

Figure 1:
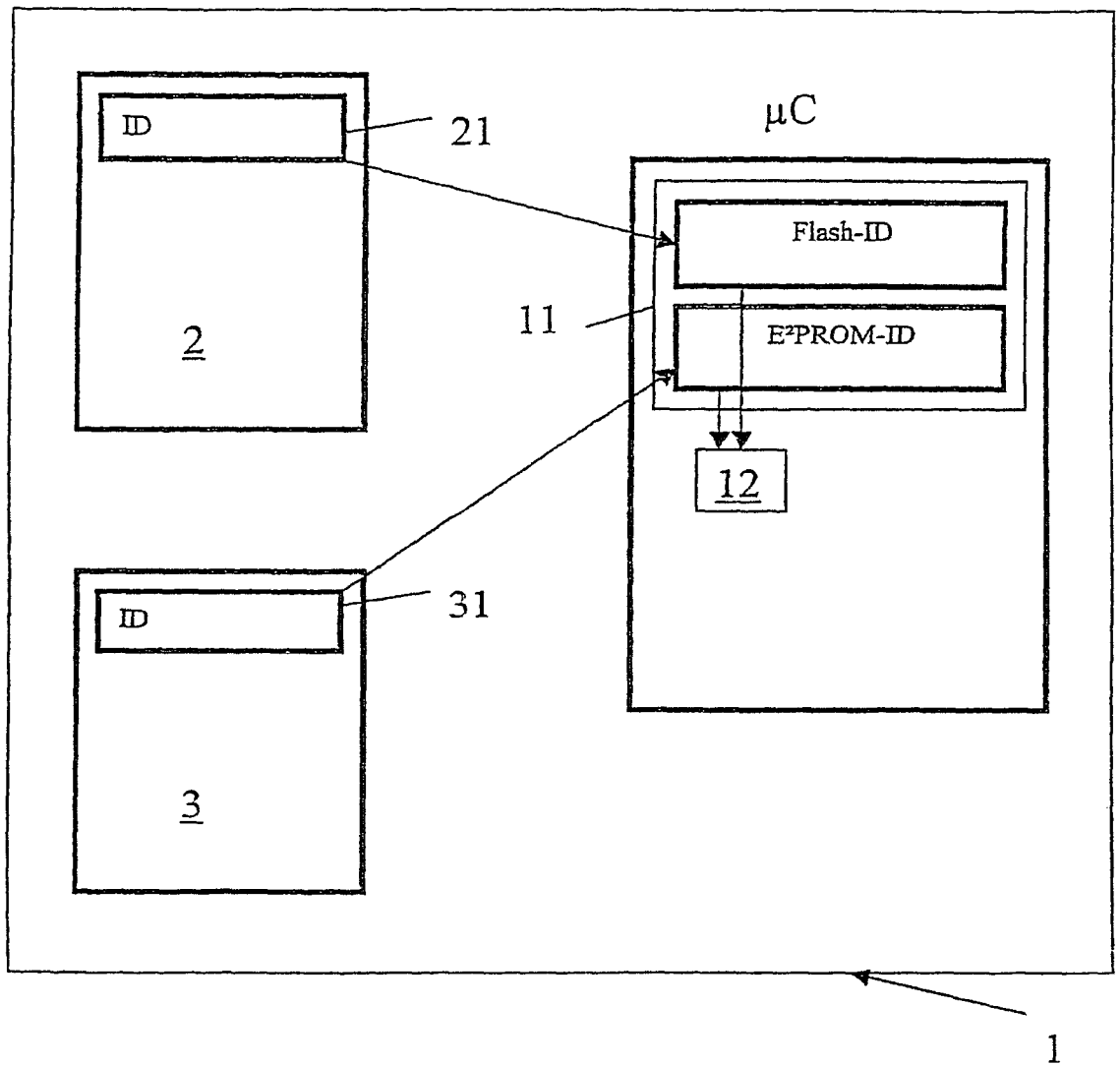
FIG. 1 shows a schematic block diagram of a first embodiment of the control device as claimed in the invention.

FIG. 1 shows one embodiment of the control device as claimed in the invention. The configuration of control devices, such as for example engine control devices, has been known for a long time from the prior art, so that this is detailed only to the extent necessary for an understanding of the invention. The control device 1 in this embodiment comprises a microcomputer μC, a flash memory 2 and an EEPROM ($E^2$PROM) 3. The flash memory 2 and the $E^2$PROM 3 each have an OTP area 21, 31. The latter are preferably configured not to be read-protected. There is also an OTP area 11 in the μC. Furthermore, an authentication unit 12 is contained in the μC. It may constitute an electronic circuit or a program in the μC.

The memory modules flash 2, $E^2$PROM 3, in this embodiment are provided with identification numbers ID which are specific to the module. They are generally written at the manufacturer of the module and are stored in the OTP area 21, 31 of the individual modules.

Figure 2:
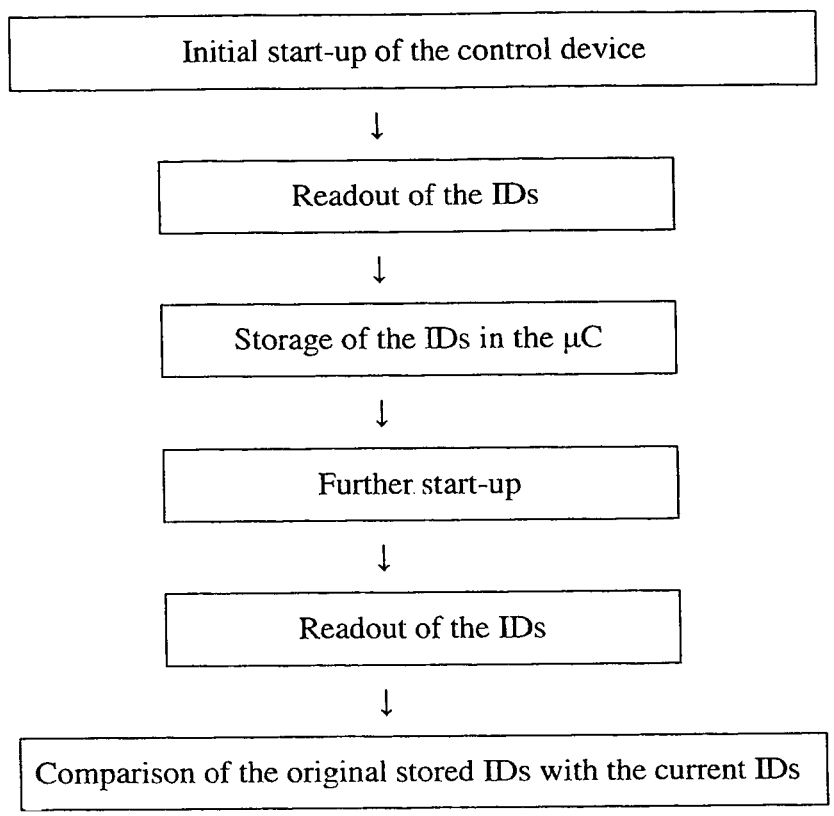
FIG. 2 shows a flow chart which represents one embodiment of the process as claimed in the invention.

FIG. 2 shows a flow chart which represents one embodiment of the process as claimed in the invention using the embodiment of the control device shown in FIG. 1.

In the process of manufacturing the control device as claimed in the invention, when the control device is started up for the first time the IDs of the individual memory modules 2, 3 are read out by the microcomputer μC and stored in the OTP area 11 of the μC, which area is writable only once. Starting from this time, operation of the control device 1 is only possible in conjunction with the IDs of the external memory modules 2, 3, which IDs are known to the μC.

With each additional start-up of the control device 1, the μC again reads out the ID of all of the memory modules 2, 3 connected to it. In a comparison unit these current IDs may then be compared to the original identifiers which are stored in the OTP area 11 of the μC. If it is established in this comparison that one of the IDs does not agree with one of the original IDs, the control device is prevented from operating or at least the change is diagnosed and optionally displayed.

Figure 3:
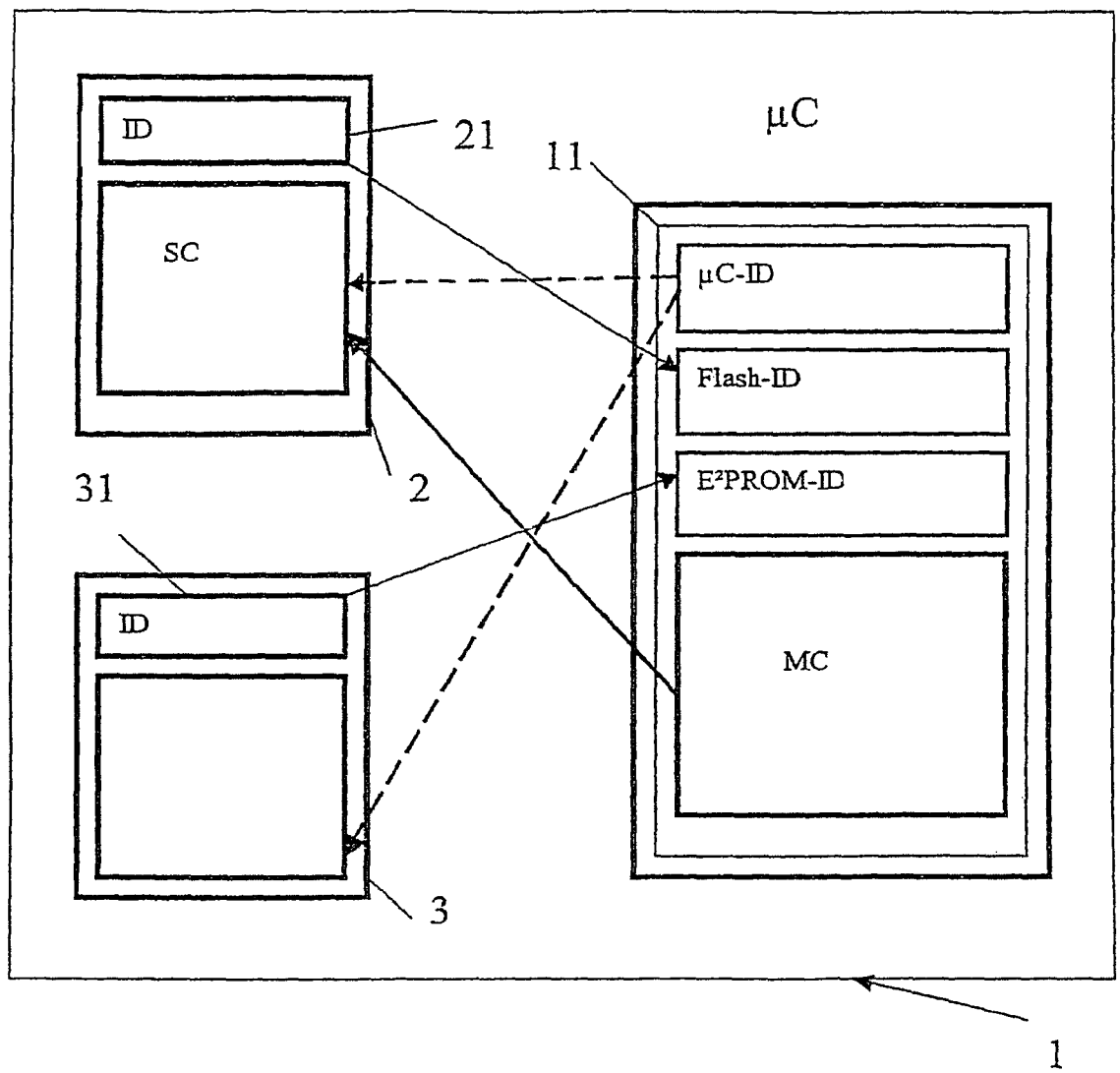
FIG. 3 shows a schematic block diagram of a second embodiment of the control device as claimed in the invention.

FIG. 3 shows another embodiment of the control device 1 as claimed in the invention. The configuration is essentially identical to the configuration of the embodiment of FIG. 1, however, in this embodiment the code for operating the control device is divided into a master code (MC) and a sub-code (SC). The master code MC contains elementary, essential functionalities for operating the control device, for example the program for generating signals for the connected actuators (not shown) of the control device or the program for computing the actuating variables and outputs. The master code MC can furthermore comprise data. In the sub-code SC additional programs and data are contained. The control device can only operate using both codes, MC and SC. In the illustrated embodiment the sub-code SC is contained in a rewritable area of the flash memory 2. The master code MC is contained in the OTP area 11 of the microcomputer μC. The master code is preferably protected against read-out by way of contact-making. This can be achieved for example either physically by failure of a transistor channel or by circuit engineering. The sub-code SC in contrast to the master code MC can be modified or overwritten. This allows updating of the sub-code or reprogramming.

Furthermore, the μC has an identification number μC-ID. It is also stored in the read-protected OTP area of the μC. In the $E^2$PROM other data for operating the control device are stored in a rewritable area. These data may for example constitute adaptation values and idle rpm for an engine control device.

When the control device is initialized, the microcomputer μC learns the identification numbers which have been stored in the OTP area 21, 31 of the memory modules 2, 3 and which thus cannot be changed, and stores them in the OTP area of the microcomputer μC which can also optionally be configured as read-protected.

From this time on, the memory modules 2, 3 which are connected to the microcomputer are known to the microcomputer μC via their ID.

In addition, the IDs of the memory modules stored in the microcomputer can also be used for encryption of data or programs. Thus, the data stored on the $E^2$PROM can be encoded for example by a symmetrical encryption process in which the key comprises at least part of the ID of at least one of the memory modules 2, 3. In an engine control device the $E^2$PROM can store for example learned values, production data, adaptation values and the like. Basically all symmetrical encryption processes which allow incorporation of an identifier which is specific to the control device are suited for encryption. Preferably the data of the $E^2$PROM are encrypted by a key which in addition or as an alternative to the ID of the external memory modules comprises the ID of the microcomputer μC. This effects encryption which is specific to the control device and which makes it impossible to replace the $E^2$PROM or overwrite the data stored on it or prevents operation of the control device after such manipulation. The key is preferably stored in the RAM of the microcomputer μC. In this way the key is generated each time the control device boots up with the incorporation of an identifier which is specific to the control device (for example the ID of the μC and optionally the IDs of the memory modules) and thus the key is specific to the control device.

Furthermore, the sub-code SC can be stored wholly or partially encrypted on the flash memory 2. For this encryption the ID of the individual memory modules or of the microcomputer or part of this ID can also be integrated into the key. The decryption of the data in the sub-code is effected by the master code. Since the latter is stored in a read-protected area of the microcomputer, read-out of the program and thus copying of the software can be prevented.

Monitoring of the sub-code relative to manipulation which is ensured by the μC in the master code can also take place by way of processes other than encryption. Thus, as an alternative or in addition, linear/CRC checksum formation or hash value formation may be used. To detect completed manipulation of the data and optionally parts of the sub-code, linear checksums are formed for example over selected areas and the result which is encrypted as a fingerprint is placed in the sub-code. The master code in control device operation, for example when there is a signal on the terminal 15, over the same predefined area computes the comparison value (for example, linear checksum) and checks it against the decrypted reference value which has been stored encrypted in the sub-code. The type of manipulation detection may be selected arbitrarily.

After detecting manipulation, the master code initiates measures which may lead to control device failure.

Figure 4:
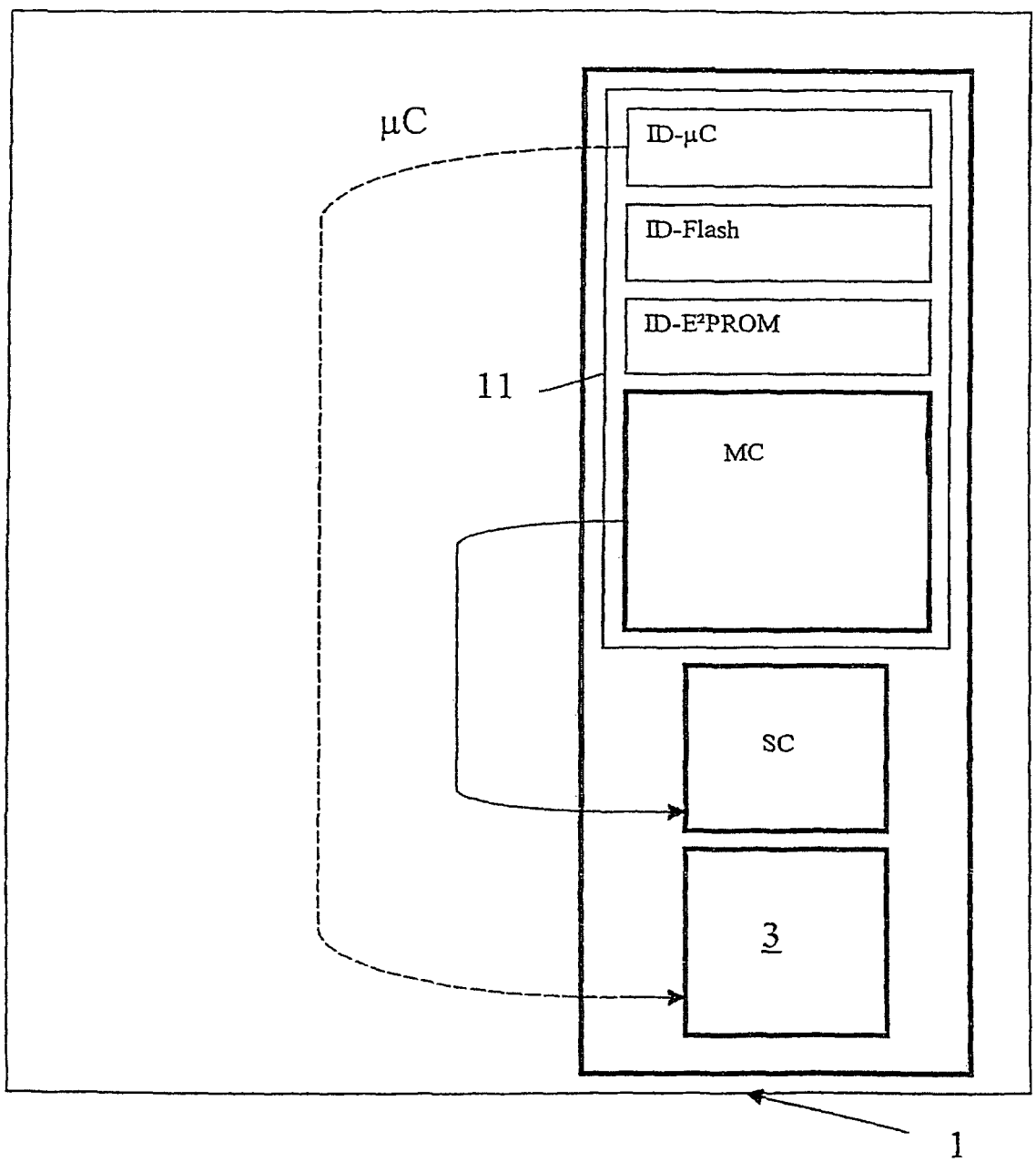
FIG. 4 shows a schematic block diagram of a third embodiment of the control device as claimed in the invention.

FIG. 4 shows another embodiment of the control device as claimed in the invention. In this embodiment the memory modules 2 and 3 are integrated into the microcomputer μC. The μC here has an embedded flash memory, the $E^2PROM$ being emulated. This configuration of the control device does have the advantage that replacement of the memory modules can be reliably prevented, however, the data in the emulation of the $E^2PROM$ can be overwritten only block by block.

The process for protection against manipulation takes place in this control device with an internal memory essentially analogous to the one described in the foregoing for control devices with external memories. Here in particular the data of the emulated $E^2PROM$ can be stored encrypted and can be decrypted by a key which comprises at least an individual identifier of the control device, such as the μc-ID and/or the flash ID. Likewise the encrypted data or fingerprints contained in the sub-code which is stored in the flash memory of the μC may be decrypted by the master code. In this instance preferably an identifier which is specific to the control device is also integrated in the key.

The invention is not limited to the described embodiments. Thus the identifier of the individual memory modules may be for example the date of manufacture of the control device. This may prevent manipulation during the warranty period.

Furthermore it is for example also possible to store the code which is necessary for operation of the control device entirely in the read-protected OTP area of the μC instead of assembling it from a master code and a sub-code.

The control device for the purposes of this invention may constitute for example an engine control device, a transmission control device or a combination instrument.

A large number of advantages can be achieved compared to conventional control devices with the process as claimed in the invention and the control device as claimed in the invention.

With the control device as claimed in the invention, replacement of one or more modules can be reliably prevented since operation of the control device can be prevented by this replacement. It is not possible to read out a part of the program or data which is essential for operation of the control if this part is stored in a read-protected OTP area. Thus, copying of the software can be prevented. Access to confidential data via contact-making with the module is not possible either if they are stored in the read-protected OTP area of the μC. The control device can be protected against manipulation especially reliably by its being able to run only in the combination of the master code and sub-code. Changing the sub-code which is stored in the reprogrammable, optionally external memory, for example the flash memory, without adapting the master code leads to control device failure. Furthermore, data, which are stored for example on an $E^2PROM$, can be encrypted in a manner specific to the control device. The decryption of these data can also be made dependent on the identifier of the control device. Additional security can be achieved by the encryption and decryption being made dependent on the combination of the individual modules with the IDs which are known to the μC.

In summary it can therefore be stated that by storing an unalterable identifier of the memory modules of a control device, the manipulation of control devices, such as for example chip tuning in engine control devices, can be reliably prevented.

The invention claimed is:

1. A system mountable in a motor vehicle effective in preventing manipulation of a memory module functional in operating a control device of a component of said vehicle, comprising:
   means for reading a first identifier stored in a first area of a first memory module functional in operating said control device;
   means for reading a first encrypted code stored in a second area of the first memory module functional in operating said control device;
   means for storing said first identifier in a read only memory of said system;
   means for reading a second identifier stored in a third area of a second memory module intended to replace the first memory module;
   means for reading a second encrypted code stored in a fourth area of the second memory module intended to replace the first memory module; and
   means for authenticating said second memory module by comparing the second identifier of said second memory module with the first identifier stored in said read only memory and by decrypting the second encrypted code using a master code stored in the read only memory,
   wherein the first area and third area are one-time programmable areas, and the second area and fourth area are rewriteable areas,
   the decrypting the second encrypted code using the master code comprises determining whether the second encrypted code has been manipulated by using at least one of a key stored in the read only memory, a linear/CRC checksum formation, and a hash value formation, and
   if the second memory module is authentic, the second encrypted code corresponds to the first encrypted code.

2. A system according to claim 1 wherein said read only memory comprises a one-time programmable module.

3. A system according to claim 1 including a microprocessor provided with said storing and authenticating means.

4. A system according to claim 3 wherein said storing means of said system comprises a one-time programmable module.

5. A system according to claim 4 wherein said storing means comprises a flash memory.

6. A system according to claim 4 including means for encrypting data stored in said storing means which can be decrypted by a key comprising said identifier.

7. A system according to claim 1 wherein said control device comprises one of a group consisting of the engine, transmission, turbocharger, oil cooler and brake control devices of said vehicles.

8. A system according to claim 1, wherein the first memory module stores programs and data used to operate the control device.

9. A system according to claim 8, wherein the data include adaptation values for controlling an engine control device.

10. A system according to claim 1, wherein the first identifier stored in the first memory module is specific to the first memory module, and the second identifier stored in the second memory module is specific to the second memory module.

11. A system according to claim 1, wherein the authenticating means detects that the first memory module is replaced by the second memory module when the read second identifier does not match the first identifier stored in the read only memory.

12. A system according to claim 1 wherein the control device operates using both the first encrypted code and the master code, and the master code is protected from being read out of the read-only memory.

13. A method of preventing manipulation of a memory module provided in a system, functional in operating a control device of a motor vehicle component, comprising:

storing a readable first identifier in a first area of a first memory module connectable to said system, functional in operating said control device;

storing a first encrypted code in a second area of the first memory module functional in operating said control device;

reading said first identifier stored in said first memory module;

storing said first identifier in a second memory, wherein the second memory is a read only memory;

reading a second identifier stored in a third area of a third memory module intended to replace said first memory module;

reading a second encrypted code stored in a fourth area of the third memory module intended to replace the first memory module; and authenticating said third memory module by comparing said first identifier of said second memory with said second identifier stored in said third memory, and by decrypting the second encrypted code using a master code stored in the read only memory, wherein the first area and third area are one-time programmable areas, and the second area and fourth area are rewriteable areas, the decrypting the second encrypted code using the master code comprises determining whether the second encrypted code has been manipulated by using at least one of a key stored in the read only memory, a linear/CRC checksum formation, and a hash value formation, and if the second memory module is authentic, the second encrypted code corresponds to the first encrypted code.

14. A method according to claim 13, wherein the first memory module functional and operating said control device is a memory module of a removable vehicle control chip.

15. A system mountable in a motor vehicle effective in preventing manipulation of a memory module functional in operating a control device of a component of said vehicle, comprising:

a microcomputer configured to read a first identifier stored in a first area of a first memory module functional in operating said control device, to read a first encrypted code stored in a second area of the first memory module, functional in operating said control device, to store said first identifier in a read only memory of said system, to read a second identifier stored in a third area of a second memory module intended to replace an installed memory module, functional in operating said control device, and to read a second encrypted code stored in a fourth area of the second memory module intended to replace the installed memory module, functional in operating said control device, wherein the microcomputer comprises an authentication unit configured to authenticate said second memory module by comparing the second identifier of said second memory module with the first identifier stored in said read only memory, and by decrypting the second encrypted code using a master code stored in the read only memory, wherein the first area and third area are one-time programmable areas, and the second area and fourth area are rewriteable areas, the decrypting the second encrypted code using the master code comprises determining whether the second encrypted code has been manipulated by using at least one of a key stored in the read only memory, a linear/CRC checksum formation, and a hash value formation, and if the second memory module is authentic, the second encrypted code corresponds to the first encrypted code.

* * * * *